United States Patent [19]

Ueki et al.

[11] Patent Number: 5,298,886
[45] Date of Patent: Mar. 29, 1994

[54] FLUIDIC FLOWMETER EQUIPPED WITH A MICRO FLOW SENSOR

[75] Inventors: Takashi Ueki; Katsuhito Sakai; Takeshi Abe, all of Tokyo, Japan

[73] Assignee: Tokyo Gas Company Limited, Tokyo, Japan

[21] Appl. No.: 714,678

[22] Filed: Jun. 13, 1991

[30] Foreign Application Priority Data

Jun. 14, 1990 [JP] Japan .................................. 2-157095
Nov. 9, 1990 [JP] Japan .................................. 2-305852
Nov. 9, 1990 [JP] Japan .................................. 2-305853
Nov. 30, 1990 [JP] Japan .................................. 2-341070

[51] Int. Cl.$^5$ .......................................... G08B 21/00
[52] U.S. Cl. .................................. 340/606; 340/603; 73/861.19; 73/196; 137/557
[58] Field of Search ............... 340/606, 608, 609, 635, 340/603; 73/861.19, 195, 196, 3; 137/551, 833, 557

[56] References Cited

U.S. PATENT DOCUMENTS 4,854,176 8/1989 Okabayashi ................... 73/861.19

Primary Examiner—Jeffery A. Hofsass
Attorney, Agent, or Firm—McGlew and Tuttle

[57] ABSTRACT

In a fluidic flowmeter for measuring the flowrate higher than the preset flowrate by use of a fluidic element and for measuring the flowrate lower than the present flowrate by use of a flow sensor inserted into the nozzle portion, the present invention relates to the fluidic flowmeter that has an abnormality judging circuit for judging an abnormality and issuing a warning signal and also zero point and gain correcting circuits when operating the flowrate on the basis for the signal being output from the flow sensor in the case that the flowrate signal higher than the preset flowrate is to be input only from the flow sensor side and in the case that the flowrate signal higher than the preset flowrate is to be input only from the flow sensor side and in the event that the flowrate signal lower than the preset flowrate is to be input only from the fluidic element side.

4 Claims, 6 Drawing Sheets (Before correction)

Qm : Necessary minimum detected value.

$l_1$ : Initial characteristics of sensor.

Pd : Zero point drift quantity of sensor.

$l_2$ : Sensor characteristics of after the correction.

(After correction)

Pm : Sensor output corresponding to Qm $l_1$ : Drifted sensor characteristics.

$l_2$ : Characteristics after correction by the conventional method.

FIG. 8
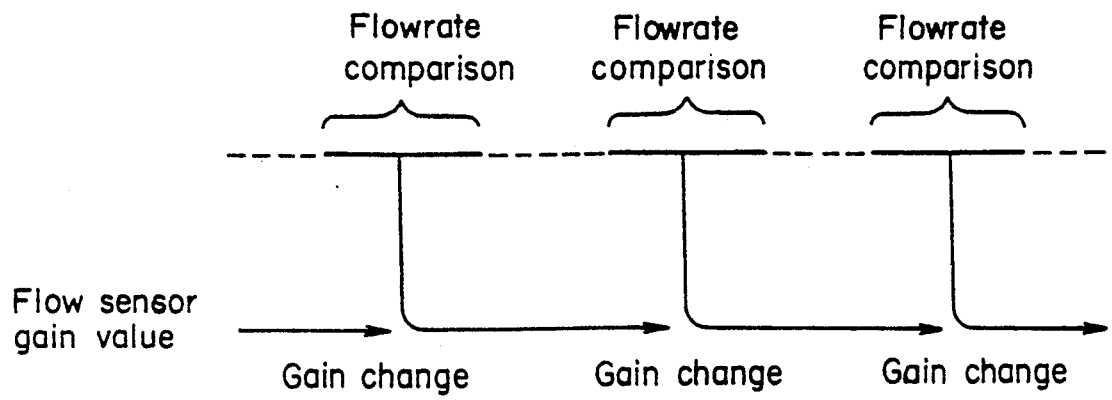
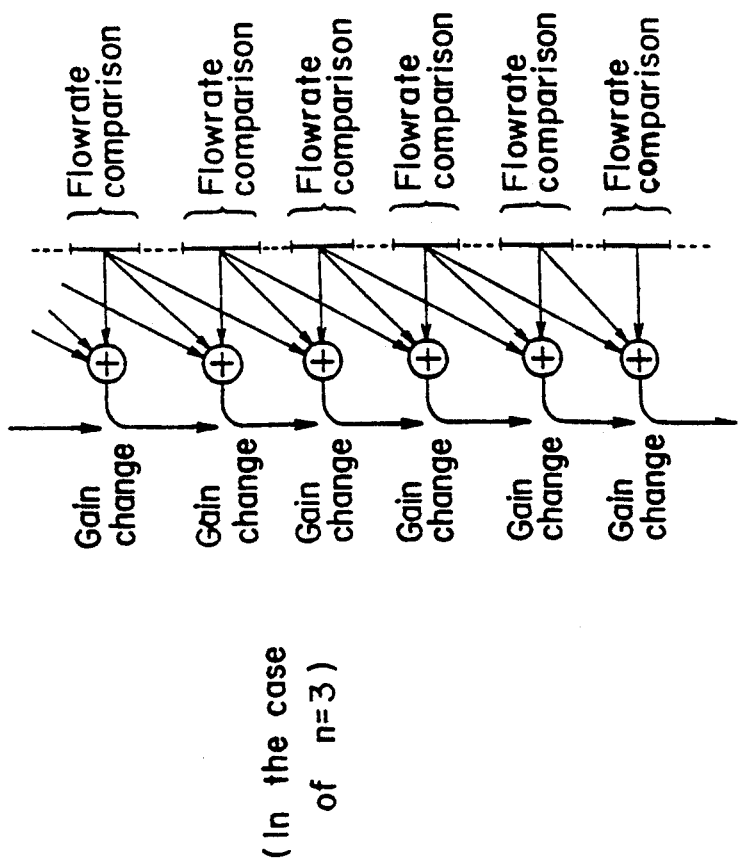
FIG. 9
(In the case of n=3)

FLUIDIC FLOWMETER EQUIPPED WITH A MICRO FLOW SENSOR

FIELD AND BACKGROUND OF THE INVENTION

This invention relates to a fluidic flowmeter for measuring the flowrates of natural gas (city gas) and other gases.

The fluidic flowmeter is a flowmeter for measuring the flowrate by structuring an adhesion wall and a feedback flow channel on a down-stream side of a nozzle to blow out the measured fluid and to generate a fluid vibration relative to the adhesion wall by use of the Coanda effect wherein the pressure propagation is transmitted to the feed back flow channel, and by designing the fluid vibration (oscillation frequency) to be proportional to the measured fluid.

As a fluidic flowmeter with this type of structure, the flowmeters stated in U.S. Pat. No. 3,640,133, U.S. Pat. No. 3,690,171, Japan Patent Official Disclosure No. 48-54962, Japan Patent Official Disclosure No. 53-77558, Japan Patent Official Disclosure No. 59-184822, etc. are already known to the public.

The aforementioned fluidic flowmeter is of a system for generating a fluid vibration inside the fluidic element and electrically using this vibration for controlling the flowrate of the measured fluid while using a micro computer. There appears no problem if the flowrate is comparatively large. However, the generation of the fluid vibration becomes unstable at a very low flowrate, causing a measurement error.

Therefore, it has been proposed to selectively measure the flowrate higher than a constant flowrate by use of a fluidic element and measure the flowrate lower than a constant flowrate by use of a flow sensor inserted into the nozzle portion. (Japan Patent Disclosure No. 1-58,118).

However, in the case of the aforementioned officially known examples, if a cable disconnection or a contact defect should happen in the flow sensor and the sensor for detecting the fluid vibration, generated by the fluidic element, and in the lead wire connecting these two sensors with the micro computer for carrying out the operation and the like, there may be a case of measuring the flowrate without noticing the disconnection problem.

Secondly, because the micro flow sensor has a high stability, it is generally used without performing the zero point correction. However, because a slight deviation from zero point is contemplated during manufacture over time, conventionally a method has been adopted including installing a dead band against the output signal in the vicinity of zero flowrate for disregarding, namely, not integrating the output in this range.

However, in the aforesaid system of disregarding the output in the vicinity of zero flowrate, no correction is made at all regardless of a drift of the zero point due to adjustment error during manufacture and fluctuations over time in the case that small pulse outputs lower than the necessary minimum detected flowrate occupy almost all the outputs, and for this reason, the drift error in the flow sensor measuring range cannot be removed. Especially in the small flowrate region, the size of such zero drift has a big influence on the measurement accuracy since it has a comparatively great value against the flowrate signal output.

Next, the micro flow sensor has a high durability and its performance rarely changes, but in preparation for the case that its sensibility changes because of the adhesion of some amount of dust and the like as many years go by, a so-called gain correction function for automatically building up the sensibility of the flow sensor has been incorporated conventionally into this type of flowmeter.

The conventional gain correction provides a system of automatically building up the sensibility of the flow sensor on the basis of the measurement flowrate of the fluidic element in the region where both the flow sensor and fluidic element work, and is based on a calculation system as given below.

When the pulse output of the flow sensor is P, there exists the following relation to the flowrate indicated value $Q_{(FS)}$ by the flow sensor.

$$Q_{(FS)} = K^i_{(FS)} P. \qquad (1)$$

where, $K^i_{(FS)}$ is the flow sensor gain at the point of time i.

Now, suppose the gas flowrate has entered the region such that it has been measured with both the flow sensor and fluidic element.

$$K^i = \frac{Q^i_{(FD)}}{P^i} \qquad (2)$$

where, $P^i$ is the mean value of the number of pulses of the flow sensor during its correction, while the $Q^i_{(FD)}$ is the mean value of flowrate measured by the fluidic element. In the conventional method, the correction shall be made by using the value for $K^i$ obtained by Formula (2) as a new flow sensor gain. That is to say, $$K^{i+1}_{(FS)} = K^i \qquad (3)$$

where the $K^{i+1}_{(FS)}$ is the flow sensor gain at the point of time i+1.

In the this conventional example, though the measured values of flow sensor and fluidic element indicate a high accuracy as the timely averaged values, the values at every measurement entail the fluctuations due to the flow disturbance and the noise. Therefore, to correct the flow sensor with a high accuracy, the outputs of fluidic element and flow sensor need to be measured over many hours for averaging the values. However in the case of the gas meter and the like that are installed at the end-user household, it is impossible to flow the gas for test purpose when correcting the flowrate, and the flowrate needs to be corrected while the gas is used by the end-user household, so the longer period required for correcting the flowrate results in the fall of correction frequencies. In addition, even in case that noise gets mingled with the measured value during the correction for some reason or other, no function for confirming it is available, and hence there is a possibility for the error in flow sensor region to increase temporarily.

OBJECTS OF THE INVENTION

It is an object of this invention to issue a warning to an electric circuit when a problem is expected and at the same time provide a method of correcting the fluctuation of the zero point and correcting the sensitivity of the flow sensor.

According to the invention, a fluidic flowmeter is provided for measuring a fluid flowrate higher than a preset flow rate established for a fluidic element and for measuring a fluid flowrate lower than the preset flowrate using a flow sensor inserted into a nozzle portion. Judging circuit means are provided for judging the presence of an abnormality and issuing a warning signal in the case that a flowrate signal higher than the preset flowrate is input only from the flow sensor and in the case that a flowrate signal higher than the preset flowrate is input only from the fluidic element. The warning signal is also issued in the event that a flowrate signal lower than a preset flowrate is input only from the flow sensor and in the event that a flowrate signal lower than the preset flowrate is input only from the fluidic element.

The invention also provides a zero point correction method for a flow sensor wherein a maximum value of the absolute value of a permissible shift quantity is set to a threshold value and a certain pulse number is contemplated to be a zero point of the flow sensor, for estimating the shift quantity only in the case that the absolute value of the flow sensor output is less than the threshold value. If the pulse number is larger than the threshold value no shift quantity is renewed upon the assumption that flow is present and the flowrate is corrected by use of the correction quantity already available at that time.

The invention also provides a gain correction method for a flow sensor for renewing the gain by a mean value of an estimated gain value at the present correction period and of an estimated gain value at a prior period, when correcting the gain of the flow sensor on the basis of comparison flowrate measured by the fluidic element. A gain correction method is also provided for renewing the gain by a weighted mean value of the gain value without correction and an estimated gain value at the correction when performing the gain correction of the flow sensor on the basis of a comparison flowrate measured by the fluidic element.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 8 is an explanatory view of a known gain correction method.

FIG. 9 is an explanatory view of gain correction method relating to the present invention.

DETAILED DESCRIPTION OF THE INVENTION

Figure 1:
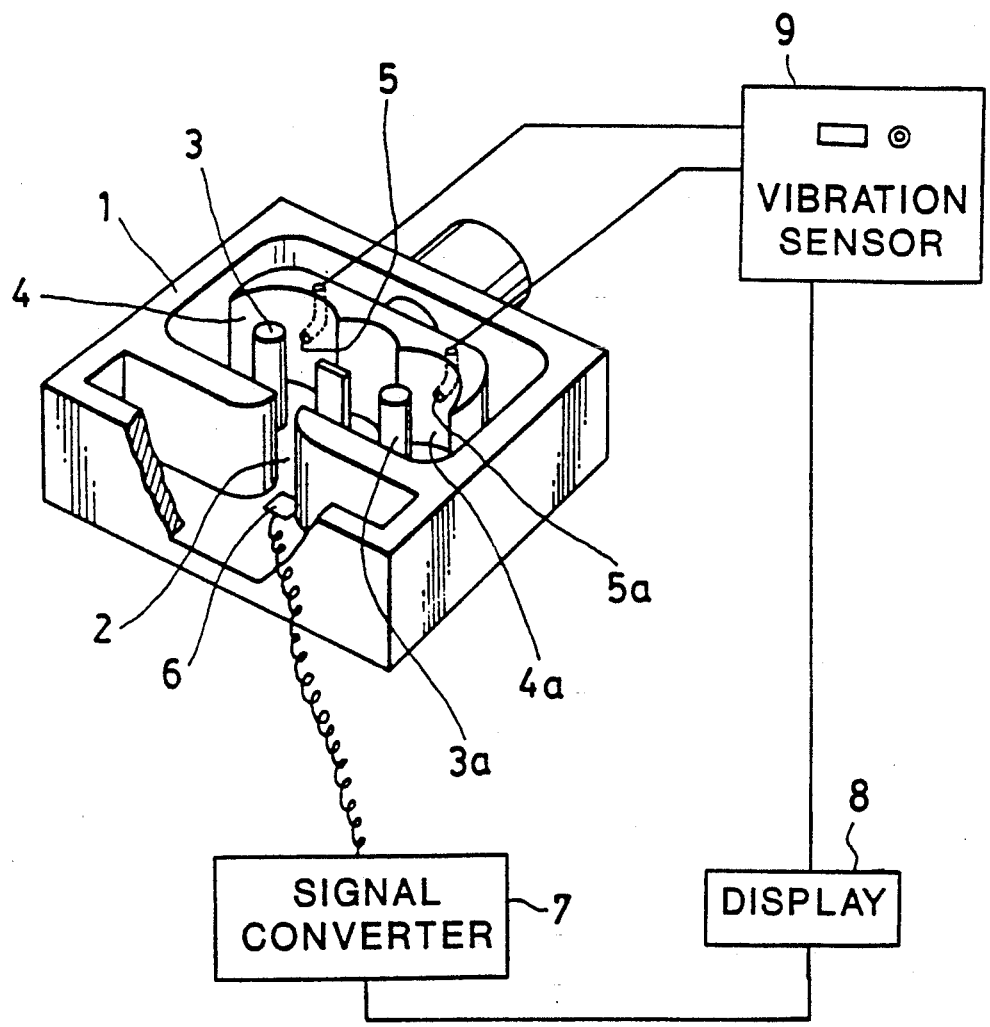
FIG. 1 is an explanatory drawing showing the fluidic flowmeter equipped with a micro flow sensor.

FIG. 1 shows the fluidic flowmeter 1 equipped with a micro flow sensor 6 into which an abnormality judging circuit has been incorporated.

The abnormality criteria of this fluidic flowmeter are as follow as.

In the region where the signals are output from both the micro flow sensor and the fluidic element, namely, in the event that the flow signals overlap each other, the micro computer selects any of the signals on the basis of the flowrate.

The micro computer monitors the output signals being output from any of these devices, and makes a judgement that an abnormality exists in any of these devices at least in the following cases.

a. In the case that a flowrate signal higher than the preset flowrate is input only from the flow sensor side.

b. In the case that a flowrate signal higher than the preset flowrate is input only from the fluidic element side.

c. In the case that a flowrate signal lower than the preset flowrate is input only from the flow sensor side.

d. In the case that a flowrate signal lower than the preset flowrate is input only from the fluidic element side.

Table 1 is an example of abnormality criteria in the event that the flowrate being measured by the fluidic element has been set to 150 liters/hour minimum and the flowrate being measured by the flow sensor has been set to the level from 0 to 150 liters/hour. The judgement will be made such that this example of combination is normal while, in other cases, any of the devices or both the devices is or are judged to be abnormal.

TABLE 1

|  | Output of fluidic element. | Output of flow sensor. |
| --- | --- | --- |
| Over 150 liters/hour | Presence | More than 700 pulses |
| 0 to 150 liters/hour | Absence | Less than 700 pulses |

A concrete abnormality judgement method is to be explained on the basis of FIG. 1. A fluidic element 1 is structured of nozzle 2, adhesion walls 3 and 3a, feedback flow channels 4 and 4a, and fluid vibration detecting ports 5 and 5a.

Micro flow sensor 6 is a flow sensor inserted into the portion of nozzle 2, and the flowrate detected by this flow sensor 6 is converted into an electric signal by the flowrate signal converting circuit 7 on the side of flow sensor. This electric signal is input to the flowrate operating/displaying circuit 8.

A fluid vibration detecting sensor 9 is in communication with the fluid vibration detecting ports 5 and 5a, and is a flowrate signal converting circuit on the side of the fluidic element for converting into the flowrate signal the fluid vibration detected by the fluid vibration detecting sensor, and the signal being converted into the electric signal by the fluid signal converting circuit 9 is input to the flowrate operating/displaying circuit 8.

Figure 2:
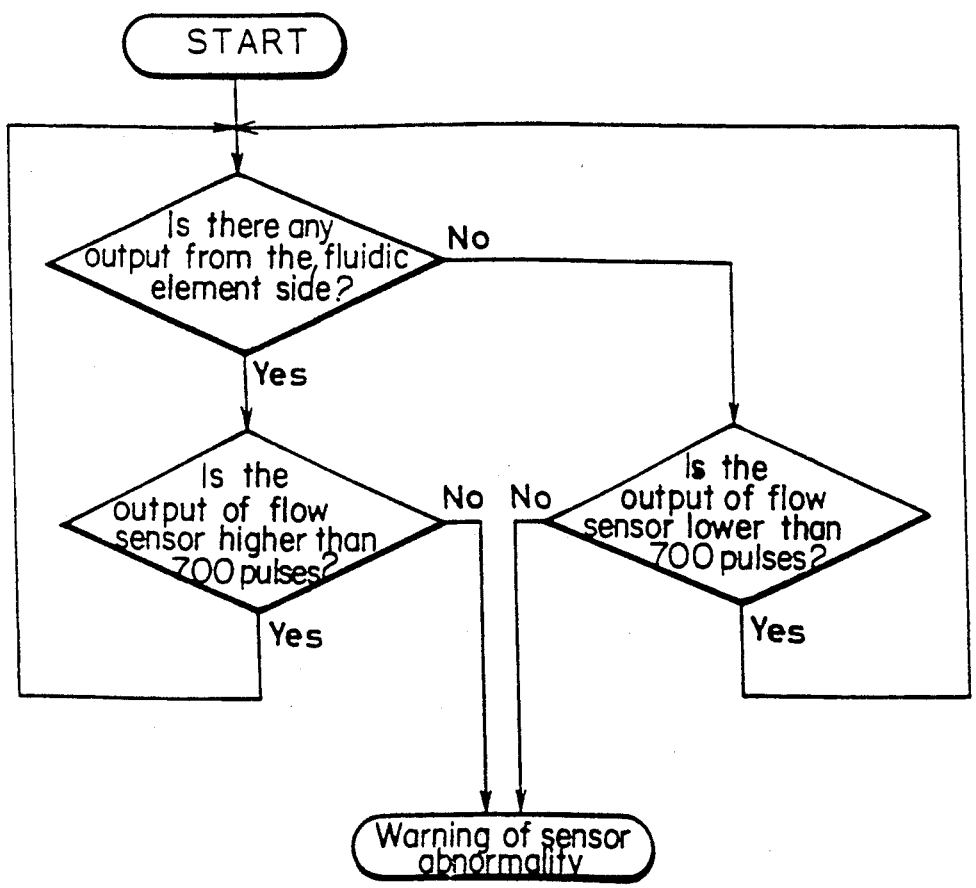
FIG. 2 is an explanatory chart of abnormality judgement method.

The flowrate operating/displaying circuit 8 comprises the circuit for converting the input electric signal into a flowrate signal for its integration and display. This circuit selectively uses the fluidic element 1 and the flow sensor 6 on the basis of the preset flowrate value and includes an abnormality judging circuit where the output (input) from the flowrate signal converting circuits 7 and 9 are judged for the presence of an abnormality in the case that the flowrate signal is higher than the preset flowrate value the input is only from the side of flow sensor 6 and in the case that the flowrate signal is higher than the preset flowrate the input is only from the side of fluidic element 1, or in the event that the flowrate signal is lower than the preset flowrate the input is only from the side of flow sensor 6 and in the event that the flowrate signal is lower than the preset flowrate the input is only from the side of fluidic element 1. FIG. 2 shows the logic diagram in the case of providing a warning the sensor abnormality.

In the case that the presence of abnormality has been determined, it should be determined optionally if the alarm should be issued for simultaneously stopping the measurement of the meter or if the abnormality should be monitored for a certain period of time and in the event of recovery the fact in the meantime should be recorded and the measurement should be continued as it is, or not.

Because this invention, as described above, monitors the outputs of the fluidic element 1 and the flow sensor 6 in the abnormality judging circuit and at least issues the warning in the case of judging the presence of an abnormality, there is no fear of continuing the measurement without noticing such abnormalities as the disconnection, short circuitry, contact defect, etc. of the lines connecting the fluid vibration detecting sensor and the flow sensor as well as these two sensors and the electronic circuits.

Figure 3:
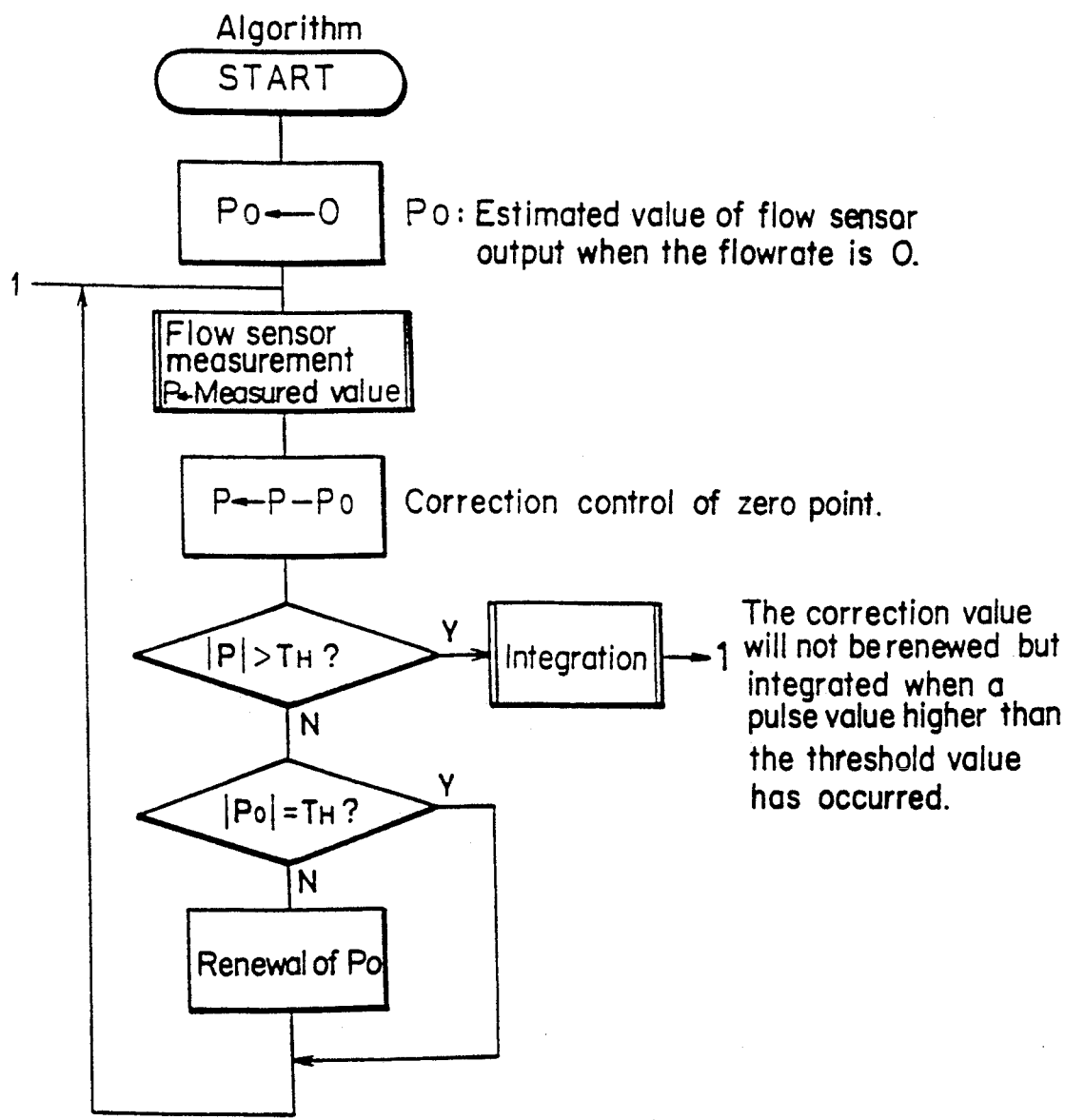
FIG. 3 is an explanatory chart of a zero point correction algorithm of a flow sensor.

FIG. 3 shows the algorithm of a zero point correcting method of flow sensor 6 according to the invention.

First, after its start, the estimated value Po of the flow sensor output when the flowrate is 0 is set. The absolute value of Po is subtracted from the value P (a value that was measured actually by the flow sensor) and is compared with the threshold value $T_H$. If the pulse number is smaller than the value $T_H$, the pulse number (output) is considered to be the zero point of the flow sensor for estimating a shift quantity for conducting the zero point correction. If the pulse number is larger than the threshold value, the presence of flow is considered and the flowrate is to be corrected by use of the correction quantity at that time without renewing the shift quantity.

The concrete correction method is to be explained with reference to FIGS. 4(A) and (B).

Suppose, as shown in FIG. 4(A) that the initial characteristics of the sensor which was $l_1$ in the flowrate versus the sensor output characteristics drifted because of a manufacturing adjustment error, time elapse change and the like, the sensor output for 0 flowrate became $P_d$ and the characteristics also shifted to $l_2$. Now, suppose the threshold value $T_H$ in the correction algorithm as $T_H = P_m/2$  $P_m$: Minimum necessary detected flowrate, then the sensor output during 0 flowrate is $P_d$, and because the following conditions can be satisfied:

$$T_H > |P_d|$$

the mean value of sensor output is $P_d$ if the flowrate is actually 0, so the 0 point correction value Po gradually becomes as follows:

$$P_o = P_d$$

Figure 4:
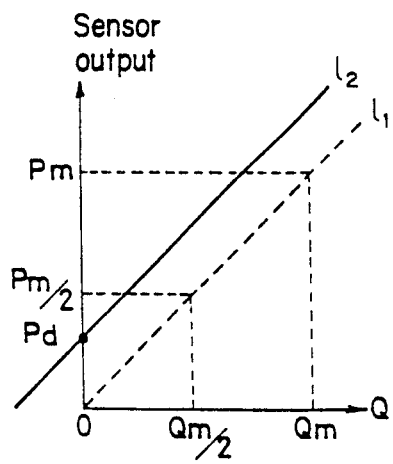
FIG. 4 through FIG. 7 are explanatory graphs of a zero point correction method.
Figure 4:
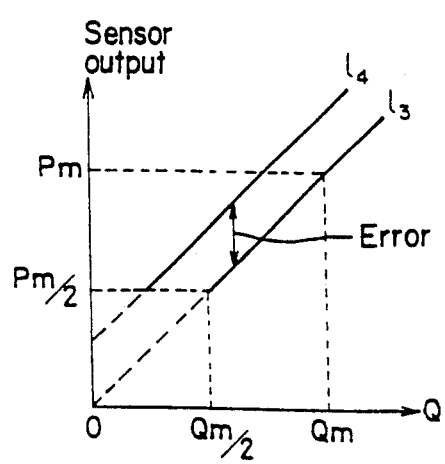

Therefore, suppose the output of the sensor is P if the flowrate is more than $Q_m/2$ as shown in FIG. 4 (B), the sensor output $\hat{P}$ after its correction becomes as follows:

$$\hat{P} = P - P_o$$
$$= P - P_d$$

and the sensor characteristics $l_3$ at that time coincides with the original characteristics $l_1$.

In contrast to this, because the sensor output of lower than $P_m/2$ is just cut off in the conventional system by the dead band, the drift error cannot be removed (Characteristics $l_4$ in FIG. 4 (B)).

On the other hand, when the gas meter has been installed to the end user household, it is impossible to form the situation where the flowrate is truly 0 by closing the shut-off valve and by the similar method at the time of 0 point correction, and hence the sensor output attributable to a very small flowrate lower than the necessary detected flowrate cannot be discriminated from the zero point drift.

Figure 5:
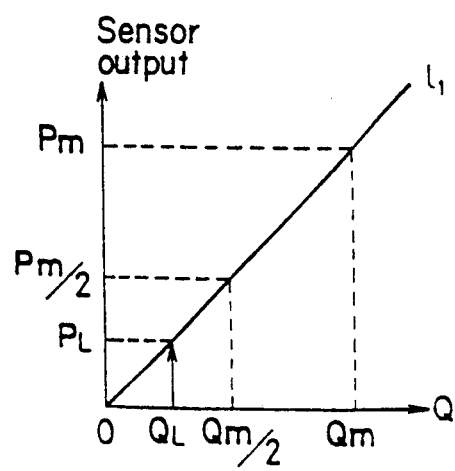
Figure 6:
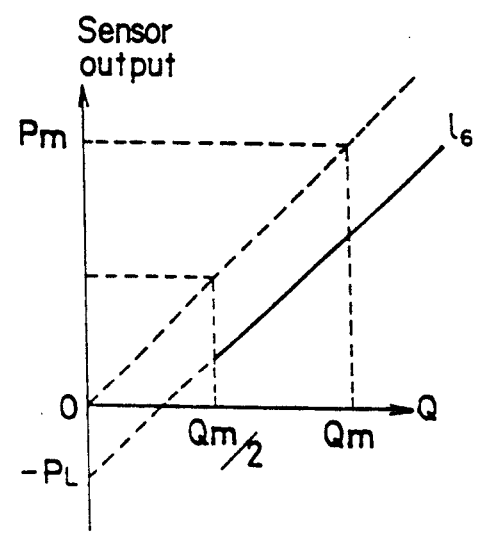

Now suppose that the micro flowrate $Q_L$ is $$|Q_L| < T_H (= Q_m/2)$$

as given in FIG. 5, then the zero point is corrected by the aforementioned algorithm, or corrected to the reverse direction by the sensor output $P_L$ corresponding to $Q_L$ as shown in FIG. 6, resulting in the characteristics of $l_6$.

Figure 7:
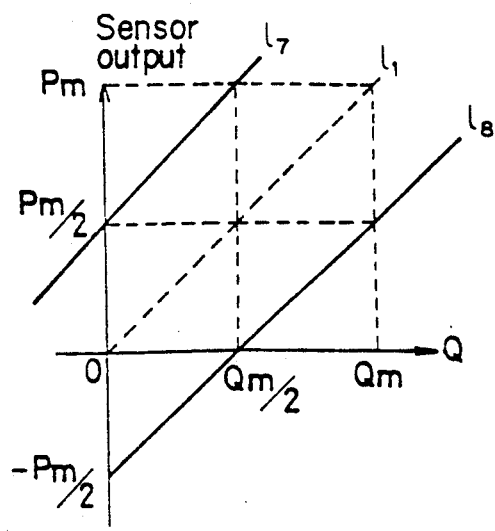

However, even in the case like this, the limit of erroneous correction goes up to $l_7$ or $l_8$ even in the worst case as shown in FIG. 7 by making the maximum value of correction quantity to be $$\text{Max}(|P_o|) < P_m/2.$$

Therefore, the sensor output at the time of flowrate 0 won't exceed $P_m/2$ even in the case of the characteristics of $l_7$ and the sensor output at the time of flowrate $Q_m$ and obtain more than $P_m/2$ even with the advent of the characteristics of $l_8$, so the flowrate 0 can still be discriminated from the flowrate $Q_m$ and the leak detecting function of flow sensor will not be damaged.

In the case of a shift to the sensor characteristics, it can be completely corrected if such a shift is less than the threshold value as described above, and the present invention can absorb the scattering of sensor characteristics during the manufacture and even its temperature dependence.

On the other hand, if there has been leakage lower than the necessary detection lower limit, the correction will be made by mistake, but the current performance can be maintained by appropriately selecting the limit value of correction. Further, the zero point is maintained with use of the mean output at the time of micro signal, the mean signal output during the absence of flowrate becomes zero, and no excessive integration will be made even if no dead band is used. As a result, a high reliability can be obtained in the case of gas meter.

Additionally, because the correction of drift quantity in zero point is destined to also correct the shift of characteristics of entire flow sensor, the measurement accuracy of sensor can also be enhanced.

At the next step, the gain correcting method of this invention is to be explained.

FIG. 8 explains the conventional method for correcting the sensibility of flow sensor with one correction.

FIG. 9 is for performing the correction by arithmetically averaging the corrected values of n-times in the past (n > or = 2:integer).

Concretely, when the pulse output of flow sensor is P, there is the following relation with the flowrate indicated value Q:

$$Q_{(FS)} = K^i_{(FS)} P \tag{1}$$

where $K^i_{(FS)}$ is the flow sensor gain at the point of time i.

Now, suppose that the gas flowrate has entered the region to be corrected, and its measurement has been made by both the flow sensor and fluidic element.

$$K^i = \frac{Q_{(FD)}}{P^i} \tag{2}$$

where $P^i$ is the mean value of pulse number of flow sensor during the correction period, and $Q_{(FD)}$ is the mean value of flowrate measures by use of the fluidic element. The conventional method performs the correction by adopting the value $K^i$ obtained by Formula (2) as a new flow sensor gain. That is to say, $$K^{i+1}_{(FS)} = K^i \tag{3}$$

where $K^{i+1}_{(FS)}$ is the flow sensor gain at the point of time i+1.

In contrast to this, the present invention is to perform the correction by use of the following formula:

$$K^{i+1}_{(FS)} = \frac{1}{n}(K^i + K^{i-1} + K^{i-2} \ldots + K^{i-n+1}) = \frac{1}{n} \sum_{j=0}^{n-1} K^{i+j} \tag{4}$$

Therefore, the effect as follows is available in accordance with the correction method of the present invention.

Because, in the conventional method, the measurement accuracy during correction has an influence on the accuracy of gain correction as it is, the measurement accuracy during correction needs to be enhanced (namely the measurement time needs to be elongated) for enhancing the accuracy of gain correction, but the gain correction is achieved by the mean value of many correction results in this invention, so the accuracy of gain correction can be maintained even if the accuracy is worse more or less at the time of individual corrections.

Next, because it becomes possible to lower the measurement accuracy at every correction and the time necessary for correction can be shortened, the frequency for correction mechanism to actuate also increases.

Then, because of the need for shortening the drive interval of the flow sensor during the correction can be eliminated, the power consumption during correction is not increased. For this reason, the timer for monitoring the correction interval becomes unnecessary.

Explained next is the gain correction method of another flow sensor for correcting the gain by the gain before correction and the weighted mean value of gain estimated value after correction when correcting the gain of flow sensor on the basis of the comparison flowrate measured by the fluidic element.

For the convenience of explanation, this method is to be explained in the relation with the conventional gain correction method.

Now, when the pulse output of flow sensor is P, there is the following relation with the flowrate indicated value $Q_{(FS)}$ by the flow sensor.

$$Q_{(FS)} = K^i_{(FS)} P \tag{5}$$

where $K_{(FS)}$ is the flow sensor gain at the point of time i.

Suppose now that the gas flowrate has entered the region to be corrected and the measurement has been made by both the flow sensor and fluidic element.

$$K^i = \frac{Q_{(FD)}}{P^i} \tag{6}$$

where $P^i$ is the mean value of pulse number of flow sensor during the correction period while $Q_{(FD)}$ is the mean value of flowrate measured by the fluidic element. In the conventional method, the correction is made by adopting $K^i$ obtained by Formula (6) as a new flow sensor gain. Namely, $$K_{(FS)} = K^i \tag{7}$$

where $K_{(FS)}$ is the flow sensor gain at the point of time i+1.

In contrast to this, the present invention renews the flow sensor gain as $$K^{i+1}_{(FS)} = K^i_{(FS)} + \alpha(K^i - K^i_{(FS)})$$

$$\alpha > 0 \tag{8}$$

where the $\alpha$ is the weighted coefficient.

If the correction method relating to this invention is adopted, the effects as follows are available.

Because, in the conventional system, the measurement accuracy during the correction has an influence on the accuracy of gain correction as it is, the measurement accuracy during the correction needs to be enhanced (namely, the measurement time needs to be elongated) so as to enhance the accuracy of gain correction, but because, in this invention, the gain correction can be conducted by the mean value of many correction results, the accuracy of the gain correction can be maintained even if the accuracy is worse more or less during the individual corrections.

Next, because it becomes possible to improve the measurement accuracy at every correction and the time required for the correction can be shortened, the frequency for actuating the correction mechanism also increases.

Moreover, because the need for shortening the drive interval of the flow sensor during the correction can be eliminated, there is no increase in consumed power during the correction. Therefore, the time for monitoring the correction interval becomes unnecessary.

Next, what needs to be memorized or recorded in advance is only the gain used last time. For this reason, the memory region of correction circuit can be saved.

Furthermore, the optimization can be made without difficulty because there only exists a single parameter $\alpha$.

While a specific embodiment of the invention has been shown and described in detail to illustrate the application of the principles of the invention, it will be understood that the invention may be embodied otherwise without departing from such principles.

What is claimed is:

1. A fluidic flow meter, comprising: a fluidic element; a flow sensor, said fluidic element for measuring a flowrate higher than a preset flowrate of said flow sensor and said flow sensor for measuring a flow rate lower than a flow rate measurable by said fluidic element; and, abnormality judging circuit means for determining the presence of an abnormality and issuing a warning signal when one of the following conditions is present only a flowrate signal from said flow sensor is higher than a preset flowrate, only a flowrate signal from said fluidic element is higher than said preset flow rate, only a flowrate signal from said flow sensor is lower than said preset flowrate, and only a flowrate signal from said fluidic element is lower than said preset flowrate.

2. A fluidic flow meter according to claim 1, further comprising zero point correction means for setting a maximum value of the absolute value of a permissible shift quantity to a threshold value and a pulse number as a zero point of the flow sensor for estimating a shift quantity only in the case that an absolute value of a flow sensor output is less than said threshold value and if said pulse number is larger than said threshold value, no shift quantity is renewed based on the assumption that flow is present, and the flowrate is corrected by use of a correction value available at that time.

3. A fluidic flow meter according to claim 1, further comprising gain correction means for renewing the gain by a mean value of an estimated gain value at a present correction period and an estimated gain value at a prior period when correcting the gain of the flow sensor on the basis of a comparison flowrate measured by the fluidic element.

4. A fluidic flow meter according to claim 1, further comprising gain correction means for renewing the gain by a weighted mean value of a gain value without correction and an estimated gain value at a correction period when performing a gain correction of the flow sensor on the basis of a comparison flowrate measured by the fluidic element.

* * * * *